United States Patent Office 2,752,375
Patented June 26, 1956

2,752,375

7-CYANO-6-KETOHEPTANOIC ACIDS AND THEIR PREPARATION

Donald S. Acker, near Wilmington, Del., assignor to E. I. du Pont de Nemours and Company, Wilmington, Del., a corporation of Delaware No Drawing. Application June 26, 1953,
Serial No. 364,498

7 Claims. (Cl. 260—404)

This invention relates to the field of organic chemistry, and particularly to the preparation of cyanoketoalkanoic acids and derivatives thereof.

This application is a continuation-in-part of the copending application Ser. No. 325,236, filed December 10, 1952, by Donald S. Acker and Charles W. Todd.

This invention has as an object the provision of a new process which process affords 7-cyano-6-ketoheptanoic acids. Other objects will appear hereinafter.

These objects are accomplished by the present invention of 7-cyano-6-ketoheptanoic acids and their preparation by the oxidation of 1-cyanomethyl-2-hydrogen cyclohexenes.

In a preferred embodiment of this invention, 1-cyanomethyl cyclohexene is converted to the corresponding ozonide by reacting with ozone at a temperature below 0° C. This process is suitably carried out in the presence of an inert organic solvent, such as a halogenated hydrocarbon. The reaction is carried out by bubbling the ozone along with a carrier gas into the solution. Completion of the reaction is readily observed when ozone is no longer absorbed, as indicated by the appearance of substantial amounts of ozone in the off-gas. In this process a solid ozonide is formed. This ozonide is then decomposed by heating in the presence of hydrogen peroxide, to obtain the desired cyanoketo acid. Excess oxidizing agent is removed by treating the product with aqueous ferrous sulfate. Excess water and solvent are evaporated and the cyanoketo acid is recovered and purified by recrystallization from an organic solvent.

The 1-cyanomethyl-2-hydrogen cyclohexenes used as starting materials may be prepared by the condensation of the corresponding cyclohexanone with cyanoacetic acid followed by thermal decarboxylation and rearrangement to the 1-cyanomethyl cyclohexene according to the method of Cope, D'Addieco, Whyte, and Glickman ("Organic Synthesis" 31, page 25, John Wiley and Sons, Inc., New York, 1951).

The following examples in which parts are by weight are illustrative of the invention.

EXAMPLE

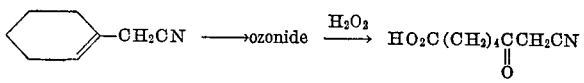

A solution of 30 parts of 1-cyclohexenylacetonitrile in 670 parts methylene chloride was treated with 4.2% ozone in oxygen for three hours at —80° C. An insoluble polymeric ozonide was formed. The methylene chloride was replaced with 525 parts of glacial acetic acid and the resulting suspension added dropwise to a solution of 28 parts of 30% hydrogen peroxide in 210 parts acetic acid at 50–60° C. This solution was heated to 90° C. for four hours and the excess peroxide decomposed with ferrous sulfate. The acetic acid and water were removed in vacuo and the residue extracted with seven portions of ether, each of 140 parts. Evaporation of the ether extracts and recrystallization of the residue from chloroform gave 15.2 parts (36%) of impure 7-cyano-6-ketoheptanoic acid. Further recrystallization from chloroform gave the pure product, M. P. 99–99.5° C.

Analysis

Calculated for $C_8H_{11}NO_3$: C, 56.79; H, 6.56; N, 8.28; mol. wt. 169.
Found: C, 56.65, 56.51, 57.28; H, 6.86, 6.81, 7.02; N, 8.11, 7.98; mol. wt. 177, 190.

When 1-cyanomethyl-4-methylcyclohexene (prepared by the method of Cope et al. noted above from 4-methylcyclohexanone and cyanoacetic acid) is substituted for 1-cyclohexenylacetonitrile in the process of the above example, the homologous product 7-cyano-6-keto-3-methylheptanoic acid is obtained.

In a similar manner 4-chlorocyclohexanone is converted to 1-cyanomethyl-4-chlorocyclohexene for the preparation of 7-cyano-6-keto-3-chloroheptanoic acid; 3-chlorocyclohexanone is converted to 1-cyanomethyl-3-chlorocyclohexene and 1-cyanomethyl-5-chlorocyclohexene for the preparation of 7-cyano-6-keto-2-chloroheptanoic acid and 7-cyano-6-keto-4-chloroheptanoic acid respectively; 4-methyl-4-dichloromethylcyclohexanone is converted to 1-cyanomethyl-4-methyl-4-dichloromethylcyclohexene for the preparation of 7-cyano-6-keto-3-methyl-3-dichloromethylheptanoic acid; 4-bromo-4-isopropylcyclohexanone is converted to 1-cyanomethyl-4-bromo-4-isopropylcyclohexene for the preparation of 7-cyano-6-keto-3-bromo-3-isopropylheptanoic acid; 3-trifluoromethylcyclohexanone is converted to 1-cyanomethyl-3-trifluoromethylcyclohexene and 1-cyanomethyl-5-trifluoromethylcyclohexene for the preparation of 7-cyano-6-keto-2-trifluoromethylheptanoic acid and 7-cyano-6-keto-4-trifluoromethylheptanoic acid respectively; 4-ethylcyclohexanone is converted to 1-cyanomethyl-4-ethylcyclohexene for the preparation of 7-cyano-6-keto-3-ethylheptanoic acid; and 3-methyl-5-isopropylcyclohexanone is converted to 1-cyanomethyl-3-methyl-5-isopropylcyclohexene and 1-cyanomethyl-3-isopropyl-5-methylcyclohexene for the preparation of 7-cyano-6-keto-4-isopropyl-2-methylheptanoic acid and 7-cyano-6-keto-4-methyl-2-isopropylheptanoic acid respectively.

The 7-cyano-6-ketoheptanoic acids of this invention are prepared from 1-cyanomethyl-2-hydrogen cyclohexenes of the following formula

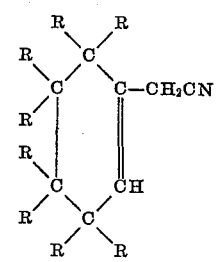

wherein each R has the formula $-(C_nH_{2n-p}X_p)H_{1-r}X_r$ wherein $n$ is a cardinal number not greater than 5, $p$ is a cardinal number not greater than $2n$, $r$ is a cardinal number not greater than 1, and X is a halogen. Oxidation of these cyclohexenes yields the corresponding cyanoketoheptanoic acids:

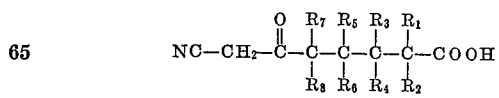

wherein $R_1$, $R_2$, $R_3$, $R_4$, $R_5$, $R_6$, $R_7$, and $R_8$ have the values given above, i. e., are the same or different R's of the formula $-(C_nH_{2n-p}X_p)H_{1-r}X_r$.

The presence of a solvent is not essential for carrying out the process of the present invention. When a solvent is used, it is preferably an inert organic solvent, e. g., a saturated liquid hydrocarbon, for example pentane, hexane, heptane, etc., or a halogenated hydrocarbon, for example ethyl chloride, carbon tetrachloride, methylene chloride, fluorotrichloromethane, etc. Solvents which participate in the reaction such as acetic acid or other liquid alkanoic acid or methanol or other aliphatic alcohols may also be used.

The oxidative cleavage of 1-cyanomethyl-2-hydrogen cyclohexenes according to this invention can be carried out by the action of an oxidizing agent which may be a mixture of ozone and oxygen as in the example, or it may be a mixture comprising ozone and oxygen and an inert gas, as in ozonized air. In place of ozone, other strong oxidizing agents may be used, such as chromic anhydride, sodium or potassium dichromate, nitric acid, etc.

The oxidation reaction may be carried out over a wide range of temperature. At 0-40° C., and even up to 100° C. with the above-mentioned oxidizing agents, the 1-cyanomethyl-2-hydrogen cyclohexene is converted directly to the cyanoketo acid. At temperatures below room temperature with ozone, especially at $-100°$ C. to 0° C., the process may lead to an intermediate ozonide which can be readily converted to the desired cyanoketo acid by the action of oxidizing agents, such as hydrogen peroxide, peracetic acid, silver oxide, and the like.

The 7-cyano-6-keto acids of the present invention besides being new compositions of matter are useful for conversion to the corresponding 5-(1,2-dithiolane-3-yl)-pentanoic acids as shown in the equations below wherein —R— is —$[C[(C_nH_{2n-p}X_p)H_{1-r}X_r]_2]_4$— in which $n$ is a cardinal number not greater than 5, $p$ is a cardinal number not greater than $2n$, $r$ is a cardinal number not greater than 1, and X is a halogen.

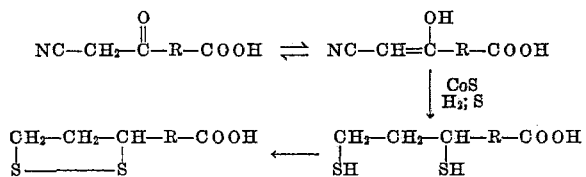

The dithiols and dithiolanes so obtained are useful as inhibitors of rancidification in fats and oils.

The 7-cyano-6-ketoheptanoic acids of the present invention can be converted to the corresponding alkyl 7-cyano-6-ketoheptanoates by reaction with alcohols, e. g., with dry ethanol saturated with dry hydrogen chloride either at room temperature or at refluxing temperatures. These esters, for example, methyl and ethyl 7-cyano-6-ketoheptanoate, butyl 7-cyano-6-keto-3-methylheptanoate, etc., are novel and useful. Thus, by reaction with ammonia or primary or secondary aliphatic or aromatic amines they furnish the corresponding amides, for example, 7-cyano-6-ketoheptanoamide, N,N-diethyl-7-cyano-6-ketoheptanoamide, etc.

The foregoing detailed description has been given for clearness of understanding only and no unnecessary limitations are to be understood therefrom. The invention is not limited to the exact details shown and described for obvious modifications will occur to those skilled in the art.

What is claimed is:
1. 7-cyano-6-ketoheptanoic acid.
2. An alkyl ester of 7-cyano-6-ketoheptanoic acid.
3. A 7-cyanoketoheptanoic acid of the formula

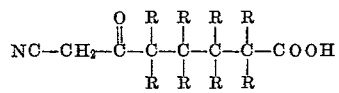

wherein the R's are each of the formula

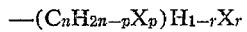

wherein $n$ is a cardinal number not greater than 5, $p$ is a cardinal number not greater than $2n$, $r$ is a cardinal number not greater than 1, and X is a halogen.

4. An alkyl ester of an acid according to claim 3.
5. A process for the preparation of 7-cyano-6-ketoheptanoic acid wherein 1-cyclohexenylacetonitrile in an inert solvent is reacted, at a temperature up to 0° C., with ozone, the resulting ozonide decomposed by heating with hydrogen peroxide, and the resulting 7-cyano-6-ketoheptanoic acid isolated.
6. A process for the preparation of a 7-cyano-6-ketoheptanoic acid wherein a cyclohexene having, on the doubly bonded carbons, one hydrogen and one cyanomethyl, —CH₂CN, group is reacted, at a temperature up to 0° C., in an inert solvent with ozone, the resulting ozonide decomposed by heating with hydrogen peroxide, and the resulting 7-cyano-6-ketoheptanoic acid isolated.
7. A process for the preparation of a 7-cyano-6-ketoheptanoic acid wherein a cyclohexene having, on the doubly bonded carbons, one hydrogen and one cyanomethyl, —CH₂CN, group in an inert solvent is oxidized to the 7-cyano-6-ketoheptanoic acid by bringing the same in contact with a strong oxidant.

No references cited.